United States Patent [19]
Glasser et al.

[11] Patent Number: 5,530,111
[45] Date of Patent: Jun. 25, 1996

[54] CHEMICAL MODIFICATION OF SHAPED HYDROGELS IN NON-AQUEOUS MEDIUM

[75] Inventors: Wolfgang G. Glasser; Charles E. Frazier; Gamini Samaranayake, all of Blacksburg, Va.

[73] Assignees: The Center for Innovative Technology, Herndon; Virginia Polytechnic Institute and State University; Virginia Tech Intellectual Properties, Inc., both of Blacksburg, all of Va.

[21] Appl. No.: 296,171

[22] Filed: Aug. 29, 1994

[51] Int. Cl.$^6$ .............................. C08B 3/00; C08B 5/00; C08B 7/00; C08B 11/00
[52] U.S. Cl. .................. 536/56; 536/58; 536/84; 536/124
[58] Field of Search ................. 536/56, 58, 84, 536/124

[56] References Cited

U.S. PATENT DOCUMENTS

| | | | |
|---|---|---|---|
| 4,352,770 | 10/1982 | Turbak et al. | 264/184 |
| 4,983,670 | 1/1991 | Yates et al. | 525/542 |

OTHER PUBLICATIONS

Uryash, et al., Thermochimica Act 93:409–412 (1985).
Malm, et al., Industrial and Engineering Chemistry, Mar. 1951, pp. 684–691.
Burba, et al., Die Angewandle Makromolekulare Chemie 66:131–138 (1978).
Bethell, et al., Journal of Biological Chemistry, 254(8):2572–2574 (1979).
Porath, et al., Journal of Chromatography, 60:167–177 (1971).
Cuatrecasas, et al., Biochemistry, 11(12):2291–2299 (1972).
Stamberg, et al., Affinity Chromatography and Related Techniques, Elsevier Sci. Publish. Co., amsterdam, netherlands, 1982, pp. 131–141.
Motozato, et al., Journal of Chromatography, 298:499–507 (1984).
Lenfeld, et al., Institute of Macromolecular Chemistry, Czech. Academy of Sciences, "Sorbents Prepared from a Composite Reactive Carier Based on Bead Cellulose . . . ", rec'd Dec. 12, 1986, pp. 179–192.
McCormick, et al., Polymer, 28:2317–2323 (1987).
Hassner, et al., Tetrahedron Letters, 46:4475–4476 (1978).
McCormick, et al., Macromolecules, 23:3606–3610 (1990).
Shimizu, et al., Cellulose Chemistry and Technology, 23:661–670 (1989).
Samaranayake, et al., Carbohydrate Polymers, 22:1–7 (Nov. 1993).
Kaster, et al., Journal of Chromatography, 648:79–90 (1993).
Peska, et al., Die Angewandle makromolekulare Chemie 53:73–80 (1976).
Stamberg, Separation and Purification Methods, 17(2), 155–183 (1988).

*Primary Examiner*—Nathan M. Nutter
*Attorney, Agent, or Firm*—Whitham, Curtis, Whitham, & McGinn

[57] ABSTRACT

A method is described for the chemical modification of pre-shaped hydrogels in non-aqueous medium. The conditions permit the reaction of highly expanded, porous hydrogel particles, such as spherical beads, using pseudo homogeneous reaction conditions in the absence of water. The method involves a three step procedure in which the porous gels are solvent exchanged int a water-free solvent (step 1) with minimal change in gel dimension and porosity; followed by reaction under non-aqueous condition (step 2); and followed by solvent exchange into water (step 3). Many different types of reactions requiring non-aqueous conditions may be carried out using these conditions. The method has particularly been demonstrated for crosslinking fluorinating beads, and for esterifying beads in a reaction involving multifunctional free carboxylic acids in the presence of dicyclohexylcarbodiimide (DCC).

20 Claims, No Drawings

CHEMICAL MODIFICATION OF SHAPED HYDROGELS IN NON-AQUEOUS MEDIUM

DESCRIPTION

BACKGROUND OF THE INVENTION

1. Field of the Invention

The invention is directed to a method of chemically modifying a cellulosic hydrogel as a sorptive support material such as a cellulose bead. More particularly, chemical modifications are done on solvent exchanged cellulose beads in a stringently non-aqueous environment.

2. Description of the Prior Art

Hydrogels are a class of organic substances capable of retaining and "immobilizing" water in a gel state having low solids content. Hydrogels usually consist of large organic macromolecules, and are hydroxy functional polymers capable of supporting a porous network structure. Porous hydrogels are useful materials in conjunction with sorption, flow, and separation processes involving aqueous solutions. Although hydrogels can be produced in various shapes and forms, such as films, fibers, and spherical "beads", they are most commonly used in bead form because of the ability to pack beads into continuous flow columns. Beaded hydrogels from such water-insoluble polysaccharides as dextrans and cellulose have gained practical importance in the separations industry.

Cellulosic hydrogel beads have particularly attractive characteristics in terms of flow, strength, and pore (or network) dimensions. Polysaccharide gels are often materials with less than 25% solids content when drained of all free water; and solids content may be as low as 2% in the case of cellulosic beads. Hydrogels from polysaccharides are generated from solution state by crosslinking or precipitation in a non-solvent following such a shape formation procedure as atomization. Polysaccharidic hydrogels have excellent properties in terms of crush resistance when exposed to flowing streams of water. Owing to their network structure and/or porosity, they are capable of accommodating large macromolecules (e.g., MWs of 5–500,000) such as proteins and enzymes, in their pore structure.

Shaped hydrogels from polysaccharides are limited by the fact that they lack specific bonding sites capable of separating and distinguishing different water-soluble molecules on grounds of specific functionality. This apparent inactivity is usually overcome by the reaction of hydrogels in aqueous medium, usually in aqueous alkali, and in reactions usually producing ethers.

Activation/functionalization of hydrogels from polysaccharides involving aqueous alkali represent state-of-the-art hydrogel modification techniques. Although this procedure prevents the complete desiccation of the solids leading to the formation of an amorphous glassy structure, this type of modification results in dimensional changes that alter the porosity and network dimensions of the activated gel structure. Not only is the chemical modification of pre-shaped hydrogels limited to aqueous medium, this also results in loss of porosity.

No method exists today, or has been described in the state-of-art, that permits the modification of a pre-shaped hydrogel in non-aqueous medium without loss of gel structure.

SUMMARY OF THE INVENTION

It is an object of this invention to provide an improved method for chemically modifying cellulosic hydrogels.

It is another object of this invention to provide a method to modify, by chemical reaction, an expanded hydrogel, formed in a shape desirable for its end use, in reactions requiring non-aqueous medium, while avoiding pore structure collapse.

According to the invention, a pre-formed cellulose bead or other cellulosic support material that is present in hydrogel form is altered by replacing the water in the cellulosic support material with a non-aqueous solvent such as tetrahydrofuran, benzene, toluene or the like. After the water is exchanged for a non-aqueous liquid, esterification, etherification, carbanilation (i.e., reaction with an isocyanate) or other reactions can be performed utilizing non-aqueous chemistry to make cellulose derivatives. By eliminating the water, competition with the hydroxy sites on the cellulose backbone by the water molecules is eliminated; thus, modification of the cellulose can proceed with reagents that would also react with water if it were present, such as acid anhydrides, acyl chlorides, isocyanates, etc. After the cellulose support material has been modified as desired, the non-aqueous solvent is replaced with water. The invention has particular application in producing beads used for column chromatography, agglutinations, and other separation techniques wherein a particular analyte in a solution is bound to the particular functional groups which have been covalently bonded to the cellulose backbone via the modification procedure of this invention. In addition, depending upon the functional groups added to the cellulose backbone, the modified cellulose materials may be used as sorbents for separating chemicals in a waste stream.

DETAILED DESCRIPTION OF THE PREFERRED EMBODIMENTS OF THE INVENTION

The invention addresses a method for solvent exchanging expanded hydrogels from water into a water-free solvent in which the desirable non-aqueous reaction is to be performed (step 1); followed by the reaction (step 2); followed by renewed solvent exchange from the non-aqueous solvent into water (step 3). Solvent exchange of expanded hydrogels makes it possible to perform reactions in pseudo homogeneous phase in non-aqueous medium which are not possible in aqueous medium. The method allows the modification of hydroxy sites on both the inside and outside of the hydrogel structure. Modification reactions may address such properties as hydrophobicity, crosslinking, activation, functionalization, and others.

Scheme 1 shows the reaction processes of the present invention where an acid, an acyl chloride, an anhydride or an isocyanate is combined with cellulose and an optional catalyst to produce an ester or a urethane (carbanate) derivative.

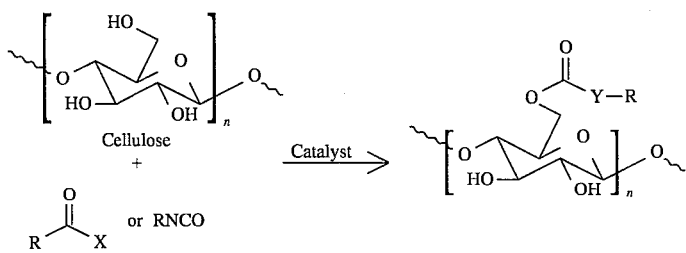

X = OH, Halogen, OCOR or other activating groups
Y = N or C

In the process, a solvent exchange of water into an organic such as tetrahydrofuran (THF), followed by exchang back into water following modification is used. Other Organic solvents could be used in place of THF for affecting the non-aqueous reaction chemistry, including dioxane, benzene, toluene, xylene, and others. In case of solvents immiscible with water but miscible with alcohols, solvent exchange may proceed stepwise from water into methanol, and from methanol into the water-immiscible solvent such as benzene. The reaction process retains the dimensional characteristics of the shaped hydrogel. Data on the shaped hydrogels which have been derivatized according to the reaction scheme have demonstrated a retention of expanded shape in excess of 70% of the original. Thus, the solids content of the beads changes insignificantly during the process of water removal.

Chemically modified cellulosic hydrogels in bead form are prepared by solvent exchanging never-dried beads with a water miscible, but non-aqueous solvent in which the reaction typically proceeds. Among qualifying reactions are esterifications with anhydrides or acyl chlorides in THF or dioxane. The reactions may also involve the free carboxylic acids in connection with such catalysts as dicyclohexylcarbodiimide (DCC), 4-pyrrolidinopyridine (PP), or tosyl chloride (TsCl) as described in the co-pending application having U.S. Ser. No. 08/296,934 to Glasser et al., entitled "Cellulose Derivatives with a Low Degree of Substitution", which is concurrently filed on even date with this application and is herein incorporated by reference. Another embodiment of this invention involves the use of NCO-functional chemical substances, isocyanates, capable of reacting with OH-functional cellulosic beads in the presence of such suitable catalysts as organic tin compounds.

The modification reaction may involve complex reagent species with highly complex chemistries that target specific sorption tasks. Among these are carboxyl, sulfhydryl (mercapto-) metal chelating, etc., functionalities.

By employing freshly cut potassium or sodium metal as desiccant in the non-aqueous solvent being used for replacing water, all traces of moisture can rigorously be excluded from the cellulosic beads. The use of moisture indicators, such as benzophenone, may optionally assist in determining conditions sufficiently anhydrous for reactions to proceed expediently and efficiently. These conditions are qualified to retain the expanded gel structure of the cellulosic hydrogel beads without destroying or significantly diminishing their porosity.

All solvents can be recovered once the modification reaction has been performed and the beads have exchanged back into aqueous medium. Solvents can efficiently be recycled by distillation.

Applications contemplated under this invention are chromatographic support media, sorbents for water purification, heavy metal concentration and removal, pesticide complexation, and many others.

EXAMPLE 1

Cellulosic beads are immersed in THF and allowed to exchange with the water inside the beads. The THF was filtered away, and then replaced with a fresh batch of THF. The beads were then placed into a soxhlet extraction apparatus, which was fitted with a source for producing a dry nitrogen atmosphere. In the sump flask, THF was refluxed over freshly cut potassium metal. Sodium metal could be used as a substitute for potassium. A tablespoon of benzophenone was added as a calorimetric indicator of dryness. The beads were dried until a blue color persisted and the resulting product was designated as "solvent exchanged beads".

EXAMPLE 2

The solvent exchanged beads of Example 1 were reacted with simple carboxylic acids or carboxylic acids having secondary functionalities such as mercapto, or protected mercapto groups.

Reaction with Benzoic Acid

Solvent exchanged beads (3.8 g THF-wet weight, 0.774 g dry weight) was added to a THF (15 mL) solution of benzoic acid (1.75 g, 1 eq/OH) and dicyclohexylcarbodiimide (5.90 g, 2 eq/OH). A catalytic amount of pyrrolidinopyridine (e.g., less than 0.1 eq/OH and preferably 0.01 eq/OH) was added to the solution and then the mixture was stirred at room temperature under a nitrogen atmosphere for 18 hr. The beads were then isolated by filtration on a sintered glass funnel. After washing with methanol and then with THF, the beads were stored in THF at 0° C.

The amount of benzoyl groups on beads were determined as methyl benzoate by methanolysis/gas chromatrography. The procedure involved the treatment of 30 mg of dry beads with 1.0M sodium methoxide/methanol (2 mL, with 3 mg/mL methyl-2-methyl benzoic acid as the internal standard) in a 3 mL vial at 50° C. for 18 hr. The supernatant was passed through a disposable silica gel cartridge to remove NaOMe. A portion of the filtrate was injected into the gas chromatograph. The reaction yielded a material with a degree of substitution (DS) of 0.4.

EXAMPLE 3

Reaction with S-protected Mercaptopropionic Acid

Solvent exchanged beads (20.45 g THF-wet weight, 2.8 g of dry cellulose) was added to a solution of 3-(2-pyridyldithio)-propionic acid (1.86 g, 0.5 moles/anhydroglucose unit (sugar units in cellulose)), dicyclohexylcarbodiimide (3.72 g, 2 eq./acid) and 4-pyrrolidinopyridine (30 mg, catalytic amounts (0.01 eq/OH)) at room temperature under nitrogen atmosphere. After a 24 hr reaction time, the beads were filtered in a sintered glass funnel and were washed with THF followed by methanol. The beads were stored in methanol at 0° C. The extent of derivatization was determined by treating beads with dithiothreatol (DTT) and spectrophotometric (UV) determination of liberated 2-thiopyridine. The activity for the beads thus calculated were 66.52 μmoles/mL, a value higher than what is available for similar commercial materials. For example, thiopropyl agarose available from Sigma Chemicals has an activity of 20–35 μmole/mL. Reaction Scheme 2 presents the reaction of Example 3.

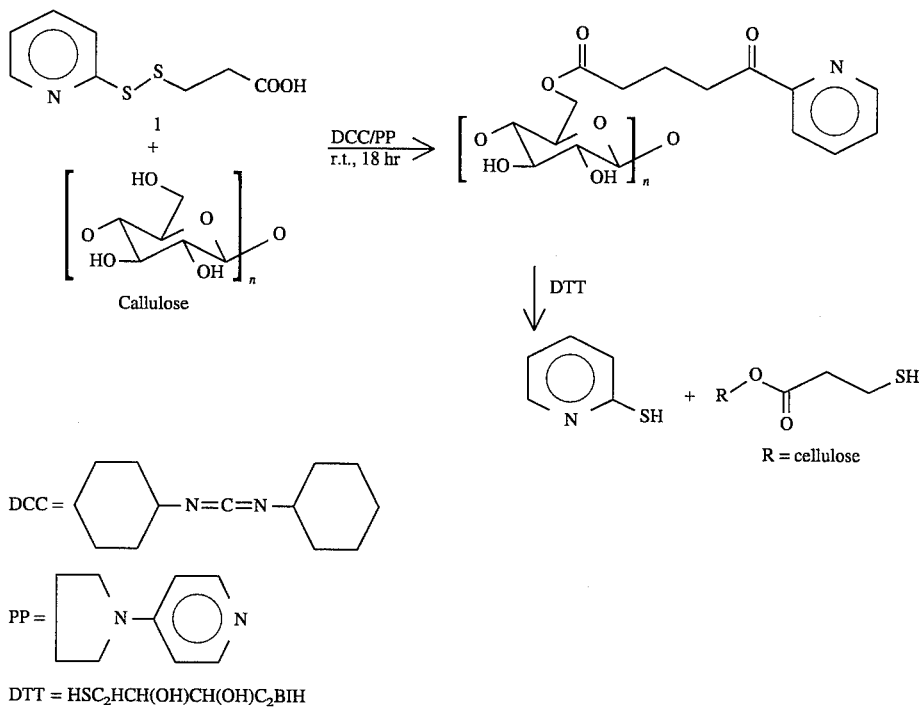

EXAMPLE 4

The solvent exchanged beads of Example 1 were transferred into a dry 250 mL round bottom flask. This flask was fitted with rubber septum, dry nitrogen atmosphere, and magnetic stir bar. Anhydrous THF, 20 mL, was added to the flask at an amount just enough to cover the beads. The flask was cooled to −70° C. in a dry ice/acetone bath. Dimethyl amino sulfur trifluoride (me-DAST), 4.5 mL (46.1 mmoles), was added slowly to the flask while slowly stirring the beads which were warmed from −70° C. to 0° C. over a period of five hours. Subsequently, the beads were maintained between −20° C. and 0° C. for a period of 3.5 hours. The flask was then removed from the cooling bath, and allowed to warm to room temperature. Quickly, the beads were poured into 200 mL of ice water containing excess $NaHCO_3$. At this time, the beads were still transparent and completely spherical. After remaining in bicarbonate solution overnight, the beads were exchanged with a large amount of distilled water into aqueous environment. These beads were insoluble in all organic solvents including DMAc/LiCl; and they had a fluorine content of approximately 3%.

While the invention has been described in terms of its preferred embodiments, those skilled in the art will recognize that the invention can be practiced with modification within the spirit and scope of the appended claims.

We claim:
1. A method for forming cellulose derivatives, comprising the steps of:
   providing a hydrogel cellulose support material comprising cellulose polymers having hydroxy sites, said hydrogel cellulose support material containing a first quantity of water;
   replacing said first quantity of water from said hydrogel cellulose support materials with a non-aqueous organic fluid;
   reacting a compound with said hydroxy sites on said cellulose polymers in said cellulose support material to form cellulose derivatives;
   replacing said non-aqueous organic fluid in said cellulose support material with a second quantity of water.
2. The method of claim 1 wherein said hydrogel cellulose support material are selected from the group consisting of beads, films, and fibers.
3. The method of claim 1 wherein said hydrogel cellulose support material comprises a porous network structure having both an exterior surface and an internal surface, and wherein said hydroxy sites on said cellulose polymers in said hydrogel cellulose support material which are reacted during said reacting step are located both on said internal surface and on said exterior surface.
4. The method of claim 1 wherein said hydrogel cellulose support material has a first porosity, first solids content, and first size dimension prior to said step of replacing said first quantity of water with said non-aqueous organic fluid, and a second porosity, second solids content, and second size dimension after said step of replacing said non-aqueous organic solvent with said second quantity of water, wherein said first porosity and said second porosity are the same and said second solids content and second size dimension are within 30% of said first solids content and first size dimension, respectively.

5. The method of claim 1 wherein said non-aqueous organic fluid is selected from the group consisting of tetrahydrofuran, dioxane, benzene, toluene, and xylene.

6. The method of claim 1 wherein said non-aqueous organic fluid comprises tetrahydrofuran 7. The method of claim 1 wherein said reacting step is a modification reaction selected from the group of esterification, etherification, carbanilation, and fluorination.

8. The method of claim 1 wherein said reacting step comprises an esterification reaction.

9. The method of claim 8 wherein said esterification reaction comprises a reaction of free carboxylic acids with said hydroxy sites on said cellulose polymers in the presence of dicyclohexylcarbodiimide.

10. The method of claim 9 wherein said free carboxylic acids comprise benzoic acid.

11. The method of claim 8 wherein said esterification reaction comprises a reaction of multifunctional free carboxylic acids with said hydroxy sites on said cellulose polymers in the presence of dicyclohexylcarbodiimide.

12. The method of claim 8 wherein said esterification reaction comprises a reaction of carboxylic acids having secondary functionalities with said hydroxy sites on said cellulose polymers in the presence of dicyclohexylcarbodiimide.

13. The method of claim 12 wherein said carboxylic acids having secondary functionalities comprises 3-(2-pyridyldithio)-propionic acid.

14. The method of claim 8 wherein said esterification reaction comprises a reaction of carboxylic acids having a mercapto group with said hydroxy sites on said cellulose polymers in the presence of dicyclohexylcarbodiimide.

15. The method of claim 1 wherein said reacting step comprises an etherification reaction.

16. The method of claim 1 wherein said reacting step comprises a carbanilation reaction.

17. The method of claim 1 wherein said reacting step comprises a fluorination reaction.

18. The method of claim 17 wherein said compound of said reacting step comprises dimethyl amino sulfur trifluoride.

19. The method of claim 1 wherein said compound of said reacting step is selected from the group consisting of an acid anhydride, an acyl chloride, and an isocyanate.

20. The method of claim 1 wherein said hydrogel cellulose support material comprises spherical beads.

* * * * *